United States Patent
Hiraoka et al.

(10) Patent No.: US 6,645,902 B2
(45) Date of Patent: Nov. 11, 2003

(54) ADSORBENT HAVING CAPABILITY OF DECOMPOSING ORGANIC HALOGEN COMPOUNDS AND METHOD FOR PRODUCING THE SAME

(75) Inventors: Masakatsu Hiraoka, Uji (JP); Katsuhiro Tokura, Nagoya (JP); Kazuyuki Oshita, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 10/031,140

(22) PCT Filed: May 11, 2001

(86) PCT No.: PCT/JP01/03961
§ 371 (c)(1),
(2), (4) Date: May 3, 2002

(87) PCT Pub. No.: WO01/87478
PCT Pub. Date: Nov. 22, 2001

(65) Prior Publication Data
US 2002/0177524 A1 Nov. 28, 2002

(30) Foreign Application Priority Data
May 15, 2000 (JP) .......................... 2000-141391

(51) Int. Cl.⁷ .............................. B01J 21/18; B01J 8/00; B01D 53/02; A62D 3/00; B09B 3/00

(52) U.S. Cl. ...................... 502/180; 502/181; 502/182; 502/230; 502/325; 502/350; 502/416; 423/239.1; 423/240 R; 423/240 S; 423/245.1; 95/142; 95/901; 588/205; 588/206; 588/248; 588/901

(58) Field of Search ................. 502/180–182, 502/185, 230, 325, 350, 416; 423/239.1, 240 R, 240 S, 245.1; 588/205, 206, 248, 901; 95/142, 901

(56) References Cited

U.S. PATENT DOCUMENTS

| | | | | | |
|---|---|---|---|---|---|
| 5,176,897 A | * | 1/1993 | Lester | .......................... | 423/659 |
| 5,254,797 A | * | 10/1993 | Imoto et al. | ................. | 588/207 |
| 5,292,704 A | * | 3/1994 | Lester | .......................... | 502/309 |
| 5,294,419 A | * | 3/1994 | Hiraoka et al. | ........... | 423/239.1 |
| 5,620,610 A | * | 4/1997 | Ishii et al. | ................... | 210/763 |
| 5,997,829 A | * | 12/1999 | Sekine et al. | ................ | 423/210 |

FOREIGN PATENT DOCUMENTS

| | | |
|---|---|---|
| EP | 0 499 644 A1 | 8/1992 |
| JP | 3-12221 | 1/1991 |
| JP | 4-118027 | 4/1992 |
| JP | 5-261284 | 10/1993 |
| JP | 8-196903 | 8/1996 |
| JP | P2000-70715 A | 3/2000 |
| JP | 2000-070715 | 3/2000 |

* cited by examiner

Primary Examiner—Mark L. Bell
Assistant Examiner—Patricia L. Hailey
(74) Attorney, Agent, or Firm—Burr & Brown

(57) ABSTRACT

An adsorbent and process for producing an absorbent capable of decomposing an organic halogen compound, is provided. The adsorbent can adsorb organic halogen compounds contained in waste gases and can assuredly decompose them without synthesizing them. A salt of Pt and/or Pd, an organic titanium compound and an organic binder are reacted in a solvent, to thereby synthesize a dispersion of an organic metal compound precursor containing Pt and/or Pd and Ti in molecules thereof, a sol of $TiO_2$ is added to the dispersion to prepare a catalyst-coating solution, an activated carbon is impregnated with the catalyst-coating solution, and the resulting mixture is heated, thereby allowing the activated carbon to carry thereon an organic halogen compound-decomposing catalyst comprising $TiO_2$ and, dispersed therein, fine particles of Pt and/or Pd. In a low temperature range of 130 to 150° C. in which the activated carbon is usable, organic halogen compounds in the exhaust gases can be decomposed, and SOx, NOx, HCl and heavy metals can be removed through adsorption.

8 Claims, 8 Drawing Sheets

| Thickness of adsorbent layer (cm) | Concentration of orthochlorotoluene in adsorbent | | | |
|---|---|---|---|---|
| | Adsorbent No. 1 | | Adsorbent No. 2 | |
| | No catalyst | Pt/TiO$_2$ carried | No catalyst | Pt/TiO$_2$ carried |
| 10 | 1.2 | 0.1 | 1.5 | 0.13 |
| 25 | 0.2 | 0.032 | 0.14 | 0.028 |
| 55 | 0.08 | 0.002 | 0.03 | 0.005 |

| Concentration of orthobromotoluene at inlet (μg/Nm³) | Concentration of adsorbent at outlet | | | |
|---|---|---|---|---|
| | Adsorbent No. 1 | | Adsorbent No. 2 | |
| | No catalyst | Pt/TiO₂ carried | No catalyst | Pt/TiO₂ carried |
| 5 | 0.006 | 0.009 | 0.002 | 0.004 |
| 22 | 0.017 | 0.03 | 0.005 | 0.007 |
| 35 | 0.022 | 0.035 | 0.03 | 0.037 |

◇ No. 1 no calalyst, at outlet
□ No. 1 Pt/TiO₂ carried, at outlet
△ No. 2 no calalyst, at outlet
× No. 2 Pt/TiO₂ carried, at outlet

| Thickness of adsorbent layer (cm) | Concentration of orthobromotoluene in adsorbent | | | |
|---|---|---|---|---|
| | Adsorbent No. 1 | | Adsorbent No. 2 | |
| | No catalyst | Pt/TiO$_2$ carried | No catalyst | Pt/TiO$_2$ carried |
| 5 | 2 | 0.2 | 2.5 | 0.45 |
| 22 | 0.8 | 0.056 | 0.45 | 0.07 |
| 35 | 0.3 | 0.009 | 0.12 | 0.01 |

◇ No. 1 no catalyst
□ No. 1 Pt/TiO$_2$ carried
△ No. 2 no catalyst
× No. 2 Pt/TiO$_2$ carried

| Thickness of adsorbent layer (cm) | Concentration of orthochlorotoluene in adsorbent | | | |
|---|---|---|---|---|
| | Adsorbent No. 1 | | Adsorbent No. 2 | |
| | No catalyst | Pt/TiO₂ carried | No catalyst | Pt/TiO₂ carried |
| 10 | 5.000 | 0.340 | 6.800 | 0.470 |
| 25 | 2.100 | 0.067 | 1.900 | 0.080 |
| 55 | 0.500 | 0.007 | 0.400 | 0.008 |

ADSORBENT HAVING CAPABILITY OF DECOMPOSING ORGANIC HALOGEN COMPOUNDS AND METHOD FOR PRODUCING THE SAME

This application is the National Stage of PCT/JP01/03961, filed May 11, 2001, published in Japanese on Nov. 22, 2001 under Article 21(2), which claims priority from Japanese Application 2000-141,391 filed May 15, 2000, the entireties of which are incorporated herein by reference.

TECHNICAL FIELD

The present invention relates to adsorbents having the capability of decomposing organic halogen compounds and being adapted to be used mainly for treating waste gases from incinerators and also to a process for producing the same.

BACKGROUND ART

As measures for reducing organic halogen compounds generated from incinerators for municipal waste and industrial waste, improvements in combustion conditions and advances in waste gas treatment have been attempted. In general, the temperature must be maintained at as high as 1000° C. or more for combustion processes to completely decompose chlorinated organic materials like organic halogen compounds through oxidation. In order to prevent damage of furnace walls, the combustion temperature is commonly set at 800 to 900° C., and therefore it is not easy to completely decompose the organic halogen compounds through oxidation by improving the combustion conditions.

In stoker furnaces, in which locally low-temperature portions or locally incomplete combustion portions are likely to be formed, a re-combustion portion needs to be provided to completely decompose the organic halogen compound through oxidation. However, there are still problems of an increase in the total waste gas amount and an increase in the running cost due to a re-combustion fuel.

Further, it is known that among the organic halogen compounds, dioxins and brominated dioxins are not only produced during a combustion process, but they are also synthesized again from remaining unburnt materials that are not completely burnt and precursor materials having benzene rings in a wide temperature ranges of about 300 to 500° C. Thus, even if the organic halogen compounds such as dioxins and brominated dioxins are intended to be reduced in the combustion process, the organic halogen compounds such as dioxins and brominated dioxins may be synthesized again during the succeeding stage, so that the organic halogen compounds including dioxins and brominated dioxins may not be reduced in the waste gases.

For the above reasons, the organic halogen compounds including dioxins and brominated dioxins are required to be reduced by treating the waste gases so that the organic halogen compounds may be stably maintained at a low concentration in the waste gases.

Among methods for removing the organic halogen compounds including dioxins and brominated dioxins by treating the exhaust gases, an adsorbing method by which such organic halogen compounds are adsorbed with activated carbon is mainly employed. However, the activated carbon having adsorbed the organic halogen compounds becomes a secondary waste product, which requires post treatment thereof.

In order to solve this problem, the present inventors had been investigating prolonging the span life span of activated carbon, particularly when used in combination with a $V_2O_5$—$TiO_2$ based catalyst or a $V_2O_5$—$WO_3$—$TiO_2$ based catalyst known as a catalyst for decomposing organic halogen compounds including dioxins and brominated dioxins. However, it was confirmed that if the concentration of dioxins and brominated dioxins (as kinds of organic halogen compounds) is low at a catalyst inlet in the case of the $V_2O_5$—$TiO_2$ based catalyst or the $V_2O_5$—$WO_3$—$TiO_2$ based catalyst, the dioxins and the brominated dioxins are inversely produced. Recently, considering in many areas that the concentration of dioxins in the waste gas is suppressed to not more than $\frac{1}{10}$ of the governmental standard value by residential agreements, it was clarified that use of such conventional organic halogen compound-decomposing catalysts might afford adverse effects on the above considerations.

Moreover, since conventional organic halogen compound-decomposing catalysts need to be used at high temperatures of 200 to 500° C., the waste gases must be heated again. Further, it was clarified that because the activated carbon cannot withstand such high temperatures, the catalyst and activated carbon cannot be used in the same position, and it is not easy to use the catalyst and the activated carbon in combination.

SUMMARY OF THE INVENTION

The present invention has been accomplished to solve the conventional problems as mentioned above, and to provide an adsorbent having the capability of decomposing organic halogen compounds. The adsorbent not only adsorbs organic halogen compounds contained in waste gases, but also effectively decomposes them to prolong the life span of the adsorbent and to suppress the amount of a secondary waste produced, while having no ability to re-synthesize the organic halogen compounds (including dioxins and brominated dioxins) at that time. The invention also provides a process for producing the same.

The adsorbent having the organic halogen compound-decomposing function according to the present invention, which has been made to solve the above problems, comprises an activated carbon and an organic halogen compound-decomposing catalyst carried on the activated carbon. The organic halogen compound-decomposing catalyst has fine particles of Pt and/or Pd dispersed in $TiO_2$ by mixing a dispersion liquid of an organic metal precursor containing Pt and/or Pd and Ti in molecules thereof with a sol of $TiO_2$ and producing the catalyst under heating.

A process for producing a catalyst having a capability of decomposing an organic halogen compound according to the present invention comprises the steps of reacting a salt of Pt and/or Pd, an organic titanium compound and an organic binder in a solvent, to thereby synthesize a dispersion of an organic metal compound precursor containing Pt and/or Pd and Ti in molecules thereof; mixing a sol of $TiO_2$ with the dispersion to prepare a catalyst-coating solution; impregnating an activated carbon with the catalyst-coating solution; and heating the resulting mixture, thereby allowing the activated carbon to carry thereon an organic halogen compound-decomposing catalyst comprising $TiO_2$ and, dispersed therein, fine particles of Pt and/or Pd. As the organic binder, an amino acid such as L-lysine or L-proline is preferably used. As the organic titanium compound, an alkoxide derivative of Ti is preferably used.

The adsorbent having the capability. of decomposing the organic halogen compound according to the present invention is produced through mixing the sol of $TiO_2$ with the dispersion of the organic metal compound precursor containing Pt and/or Pd and Ti in molecules thereof, followed by heating, thereby allowing the activated carbon to carry thereon the organic halogen compound-decomposing catalyst comprising $TiO_2$ having fine particles of Pt and/or Pd dispersed therein. Since the number of activated points is extremely large, that the catalyst can be highly activated. Therefore, while the amount of expensive Pt and Pd is reduced, the organic halogen compound can be decomposed. The mixture of the organic metal compound precursor dispersion and the $TiO_2$ sol is heated at a temperature of approximately 450° C.–500° C. in an air atmosphere under ordinary atmospheric pressure. The heating time is set at such a time in connection with the heating temperature, that the organic binder may be completely burnt out and that Pt and/or Pt may be uniformly dispersed in $TiO_2$.

Further, the organic halogen compound is not synthesized again, unlike the conventional $V_2O_5$—$TiO_2$ based catalyst or the $V_2O_5$—$WO_3$—$TiO_2$ based catalyst. In addition, the adsorbent exhibits an excellent function at the use temperature of the activated carbon of approximately 130–150° C., so that the useful life of the activated carbon can be prolonged to a few times longer than that of the conventional adsorbent, while the waste gases need not be re-heated.

DETAILED DESCRIPTION OF THE INVENTION

Figure 1:
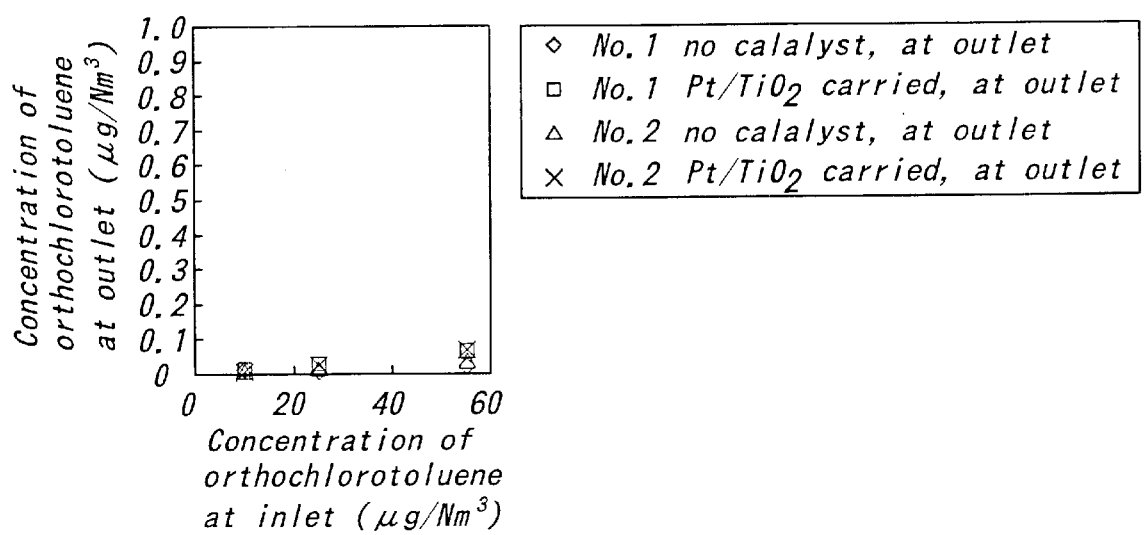
FIG. 1 is a graph showing orthochlorotoluene-removing characteristics with activated carbons carrying Pt thereon.

In the following, preferable embodiments of the present invention are described.

First, a Ti alkoxide derivative used as an organic Ti compound (for example, a derivative in which a part of a Ti alkoxide is replaced by an acetyl acetate group or a derivative in which a part of the Ti alkoxide is replaced by a triethanol aminate group), and a soluble salt of Pt and/or Pd are dissolved into a solvent containing an organic binder. As the soluble Pt salt, chloroplatinic acid, chloroplatinic acid hexahydrate, platinum dichloride, platinum tetrachloride, etc. may be used. As the Pd salt, palladium chloride, palladium nitrate, etc. may be used.

In the present invention, an amino acid such as L-lysine or L-proline may be used as the organic binder for Ti and the noble metal. Particularly, L-proline is preferred, because it has a high solubility in methanol to be used as a solvent. The organic binder is a substance which bonds Ti ions and Pt and/or Pd ions with molecules of the organic binder, fixes them in the molecules and is removed by heating to produce bound fine particles of $TiO_2$ and Pt and/or Pd, while not affording adverse effects upon the physical properties, such as catalytic poison of the resulting organic halogen compound-decomposing catalyst. The organic binder binds the Ti ions and the Pt and/or Pd ions, and fixes them in the molecules.

The mixing rates of the constituent ingredients are 100 wt. parts of the Ti alkoxide derivative, 0.5 to 5 wt. parts of the Pt and/or Pd salt, 100 to 200 wt. parts of methanol, and 0.1 to 1.5 wt. parts of the amino acid. When they are reacted at 70 to 80° C., a dispersion of an organic metal compound precursor in which the above ingredients are uniformly dispersed in a molecular level is obtained. The organic metal compound precursor means a compound in which Ti ions and Pt and/or Pd ions are bound inside one molecule via chemical bonds such that the ions have a fixed positional relationship that is different from a state in which the ions are dissolved in a solvent. In the dispersed state, Ti and Pt and/or Pd are bound together via the amino acid. A catalyst-coating solution is obtained by mixing the dispersion with 50 wt. parts of a sol of Ti acting as a glue. When activated carbon is impregnated with the catalyst-coating solution and the resulting activated carbon is heated at 450 to 500° C., the amino acid organic binder is burnt out to decompose the organic metal compound precursor. As a result, an adsorbent is provided having the capability of decomposing an organic halogen compound including the activated carbon on which is carried an organic halogen compound catalyst itself in which Pt and/or Pd are converted to super fine particles, which are highly dispersed in $TiO_2$. In this adsorbent, 1 wt. part of $TiO_2$, 0.01 wt. part of Pt and/or Pd are combined with 100 wt. parts of the activated carbon. The activated carbon is preferably a granular activated carbon having particles of around approximately 3 mm–10 mm and a BET specific surface area of 300 $m^2$/g or more.

In the $TiO_2$ sol, $TiO_2$ fine particles having primary particle diameters of around 10 nm are dispersed in an acidic solution. For example, the $TiO_2$ sol contains around 30% of $TiO_2$ itself. As the solution, a solution of nitric acid or that of hydrochloric acid may be used. Considering the effect upon the activity of the catalyst itself, it is desirable to use a nitric acid solution of $TiO_2$.

The above organic halogen compound-decomposing catalyst has improved catalytic activity, because the number of activated points is largely increased by the super fine particles of Pt and/or Pd. For this reason, the amount of expensive Pt and/or Pd used can be largely reduced as compared with the case where $TiO_2$ powder or sintered $TiO_2$ powder is coated or impregnated with an aqueous solution of a Pt and/or Pd salt and Pt and/or Pd is precipitated by thermal decomposition. Further, since the catalyst of the present invention has the capability to decompose the organic halogen compounds even at lower temperatures different from the conventional organic halogen compound-decomposing catalysts, the invention catalyst can exhibit excellent performance in a temperature range of approximately 130–150° C. in which activated carbon is usable. Consequently, the useful life of activated carbon can be prolonged to a few times longer than that of the conventional cases. Further, the waste gases need not be re-heated. The organic halogen compounds can be decomposed without fear of re-synthesis of the organic halogen compounds such as dioxins or brominated dioxins. Also, heavy metals, SOx, NOx, HCl, etc. in the waste gases can be removed by adsorption.

The adsorbent capable of decomposing the organic halogen compounds according to the present invention can be used in a low temperature zone at temperatures less than 200° C. in a waste gas-treating system. The most preferable temperature range is approximately 130–150° C. as the waste gas temperature. The way of use is not particularly limited. The adsorbent can be used to treat waste gases, for example, when it is bonded to filter clothes in a bag filter. By so doing, while dust in the waste gases can be filtered off with the bag filter, the organic halogen compounds in the waste gases can also be decomposed with the organic halogen compound-decomposing catalyst. Consequently, SOx, NOx, HCl, etc. can be adsorbed with the activated carbon, and heavy metals in the waste gases can be removed by adsorption. In this way, the adsorbent having the capability of decomposing the organic halogen compound according to the present invention can simultaneously decompose and adsorb the poisonous components contained in the waste gases. The poisonous components, once adsorbed with the activated carbon, can be gradually decomposed with the organic halogen compound-decomposing catalyst. As mentioned above, the useful life of the adsorbent having the capability of decomposing the organic halogen compounds can be largely prolonged as compared with the case where activated carbon is used alone. Thereby, the amount of the secondary waste produced can be suppressed.

EXAMPLE 1

In order to confirm the effects of the present invention, orthochlorotoluene, which is considered as a substitute for the dioxins in the catalyst engineering, was used, and its adsorption removal performance was measured. A catalyst-coating solution was prepared by adding 50 wt. parts of a TiO$_2$ sol into a dispersion of an organic metal compound precursor which had been synthesized by mixing into 100 wt. parts of an alkoxide derivative of Ti chloroplatinic hexahydrate as a Pt salt in an amount of 1 wt. part as calculated in the form of Pt, and dissolving the resultant mixture into methanol containing 1 wt. part of L-lysine as an amino acid. What was used in experiments was obtained by impregnating activated carbon with the catalyst-coating solution and producing an organic halogen compound-decomposing catalyst under heating such that the ratio was 1 wt. part of TiO$_2$ and 0.01 part of Pt relative to 100 wt. parts of the activated carbon. For comparison purposes, activated carbons carrying no catalyst thereon were used.

A total of four kinds of adsorbents, two activated carbon adsorbents, each kind consisting of two adsorbents, one being carried with a catalyst and the other with no catalyst, were used. The samples were set inside a device in which the adsorbents were kept at a temperature of 200° C. and simulated combustion waste gases including orthochlorotoluene were flown. The concentrations of the orthochlorotoluene were measured at inlets and outlets of the adsorbents and in the adsorbents.

First, analysis results of the four kinds of adsorbents are shown in Table 1. A catalyst on which Pt/TiO$_2$ was carried naturally had increased amounts of Pt and Ti. In the case that the catalysts were carried on the activated carbons, their specific surface areas were not reduced and their pore distributions were not largely changed.

TABLE 1

| Items analyzed | | Unit | No. 1 blank | No. 1 Pt/TiO$_2$ carried | No. 2 blank | No. 2 Pt/TiO$_2$ carried |
|---|---|---|---|---|---|---|
| Specific surface area | | m$^2$/g | 292 | 319 | 637 | 575 |
| Pore distribution | Total absorbed amount | ml/g | 0.316 | 0.325 | 0.422 | 0.474 |
| | Maximum pore diameter | Å | 7.24 | 6.28 | 7.27 | 5.57 |
| Iodine-absorbing ability | | mg/g | 400 | 380 | 850 | 700 |
| Ignition point | | ° C. | 700 | 700 | 687 | 700 |
| Ash | | wt % | 13.7 | 17.7 | 7.2 | 12.2 |
| Solid carbon | | wt % | 83.4 | 76.1 | 90.8 | 81.5 |
| Pt | | wt % | <0.01 | 0.02 | <0.01 | 0.02 |
| Ti | | wt % | 0.07 | 1.2 | 0.03 | 1.1 |

Figure 2:
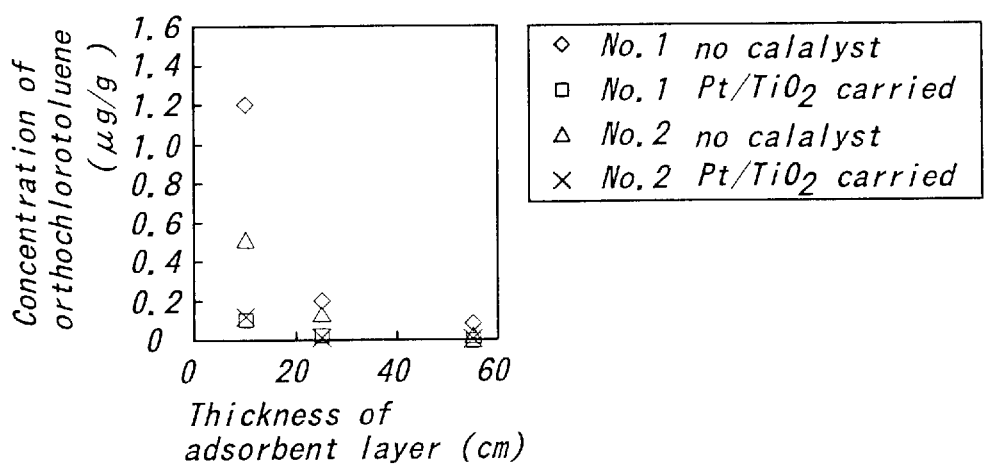
FIG. 2 is a graph showing the concentration of orthochlorotoluene in adsorbents carrying Pt thereon.

FIG. 1 is a graph showing orthochlorotoluene adsorption-removing characteristics. FIG. 2 shows the concentrations of orthochlorotoluene in the adsorbents. It is seen from these figures that although the orthochlorotoluene adsorption-removing percentages were as very high (not less than 99%), the organic chlorine compound existed inside the adsorbents carrying no catalyst thereon. However, a large amount of the organic chlorine compound did not remain inside the adsorbent with the catalyst, which revealed that the organic chlorine compound was disposed of From the above, the residual amounts of the organic chlorine compound in the used adsorbents can be reduced. The activated carbon can be regenerated at a high temperature of around 500° C. in such a reducing atmosphere that the activated carbon may not be burnt. The higher the temperature in the reducing atmosphere, the higher the effectiveness of the Pt/TiO$_2$ catalyst. Thus, under the above condition, the activated carbon carrying Pt/TiO$_2$ thereon is more readily regenerated.

EXAMPLE 2

In Example 2, orthobromotoluene was used and its absorption-removing characteristics were measured, considering organic bromine compounds including brominated dioxins as other organic halogen compounds, while Example 1 is an example carried out considering the organic chlorine compounds including the dioxins. A catalyst-coating solution was prepared by adding 50 wt. parts of a sol of TiO$_2$ to an organic metal compound precursor, which had been synthesized by mixing into 100 wt. parts of an alkoxide derivative of Ti chloroplatinic acid hexahydrate as a Pt salt in an amount of 1 wt. part as measured in the form of Pt, and dissolving the resulting mixture into methanol containing 1 wt. part of L-lysine as an amino acid. What was used in experiments were prepared by impregnating activated carbon with the above catalyst-coating liquid and producing an organic halogen compound-decomposing catalyst under heating. Relative to 100 wt. parts of the activated carbon, 1 wt. part of TiO$_2$ and 0.01 wt. part of Pt were used. For comparison purposes, activated carbons carrying no catalyst thereon were also used.

A total of four kinds of adsorbents, two kinds of activated carbon adsorbents, each kind consisting of two adsorbents, one being carried with a catalyst and the other with no catalyst, were used. The samples were set inside a device in which the adsorbents were kept at a temperature of 200° C. and simulated combustion waste gases including an orthobromotoluene were flown. The concentrations of orthobromotoluene were measured at inlets and outlets of the adsorbents and in the adsorbents.

Figure 3:
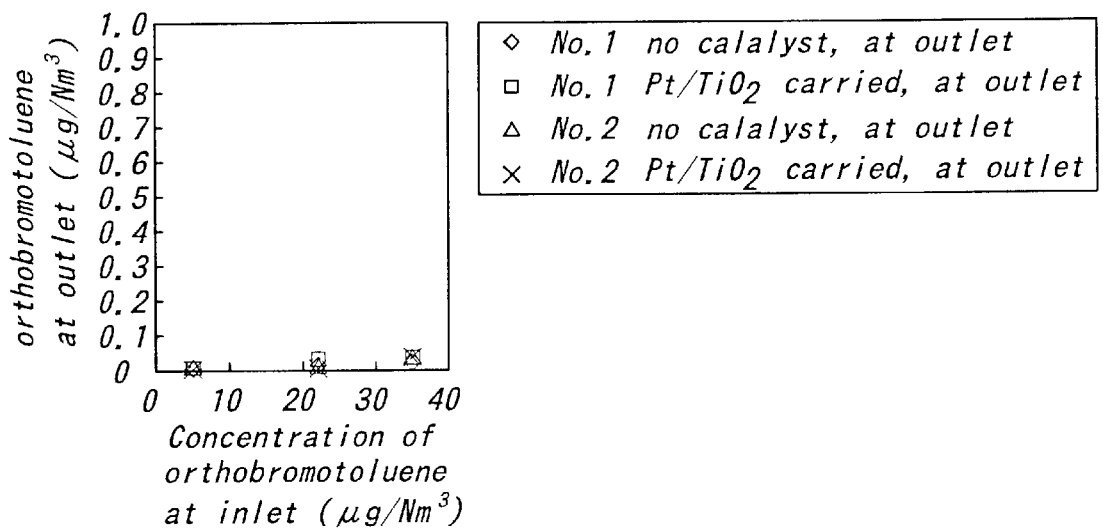
FIG. 3 is a graph showing orthobromotoluene-removing characteristics with activated carbons carrying Pt thereon.
Figure 4:
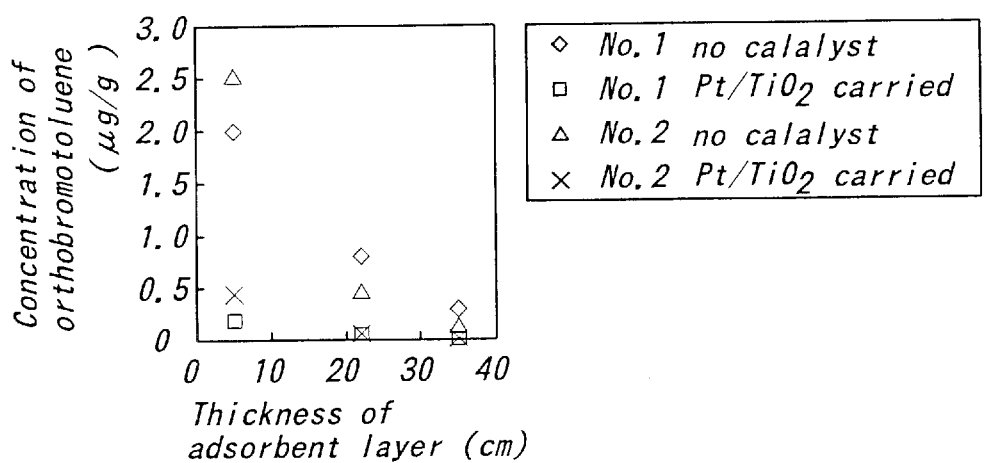
FIG. 4 is a graph showing the concentration of orthobromotoluene in adsorbents carrying Pt thereon.

FIG. 3 is a graph showing an orthobromotoluene adsorption-removing characteristics. FIG. 4 shows the concentrations of orthobromotoluene in the adsorbents. It is seen from these figures that although the orthobromotoluene adsorption-removing percentages were very high (not less than 99%), the organic bromine compound existed inside the adsorbents carrying no catalyst thereon. However, a large amount of the organic bromine compound did not remain inside the adsorbent with the catalyst, which revealed that the organic bromine compound could be disposed of.

EXAMPLE 3

In Example 3, Pd was used as a catalyst component. A catalyst-coating solution was prepared by adding 50 wt. parts of a sol of $TiO_2$ to an organic metal compound precursor, which had been synthesized by mixing, into 100 wt. parts of an alkoxide derivative of Ti, palladium nitrate as a Pd salt in an amount of 1 wt. part as measured in the form of Pd, and dissolving the resulting mixture into methanol containing 1 wt. part of L-lysine as an amino acid. What was used in experiments were prepared by impregnating activated carbon with the above catalyst-coating solution and producing an organic halogen compound-decomposing catalyst under heating. Relative to 100 wt. parts of the activated carbon, 1 wt. part of $TiO_2$ and 0.01 wt. part of Pd were used. For comparison purposes, activated carbons carrying no catalyst thereon were also provided.

Figure 5:
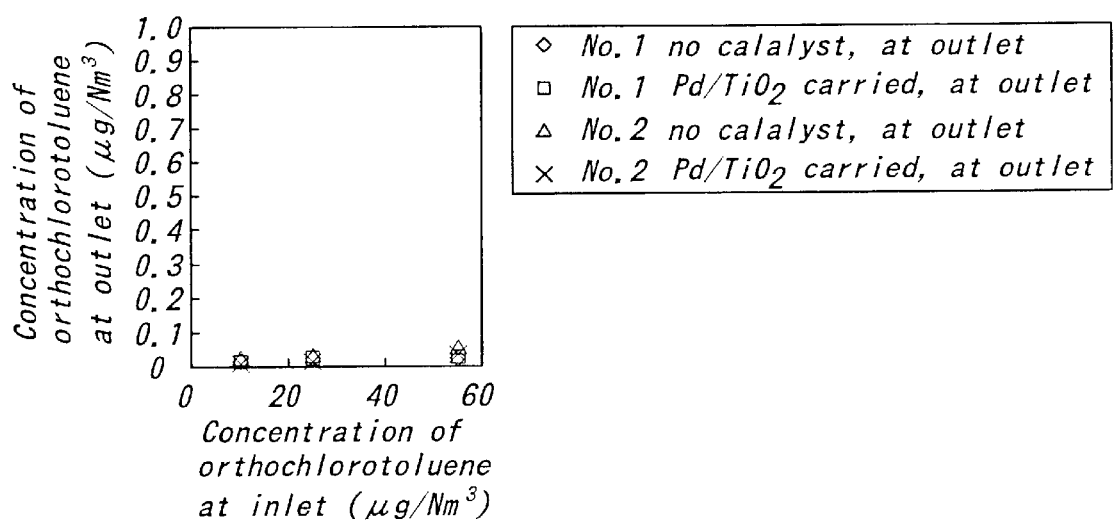
FIG. 5 is a graph showing orthochlorotoluene-removing characteristics of activated carbons carrying Pd thereon.
Figure 6:
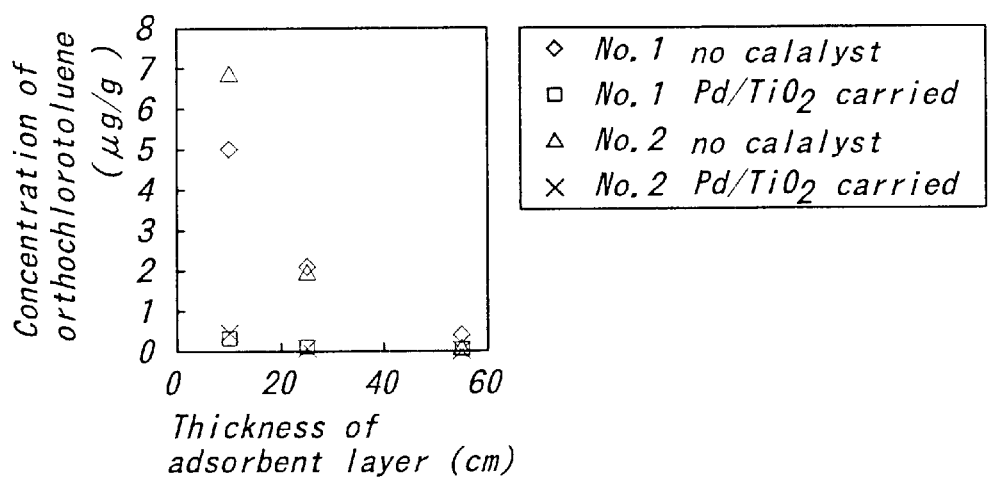
FIG. 6 is a graph showing the concentration of orthochlorotoluene in adsorbents carrying Pd thereon.
Figure 7:
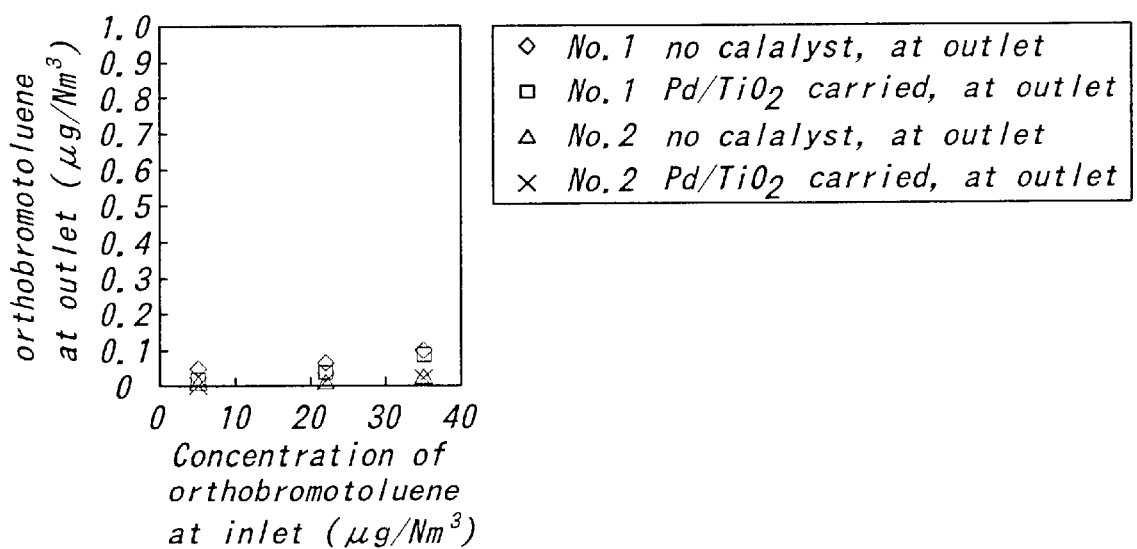
FIG. 7 is a graph showing orthobromotoluene-removing characteristics with activated carbons carrying Pd thereon.
Figure 8:
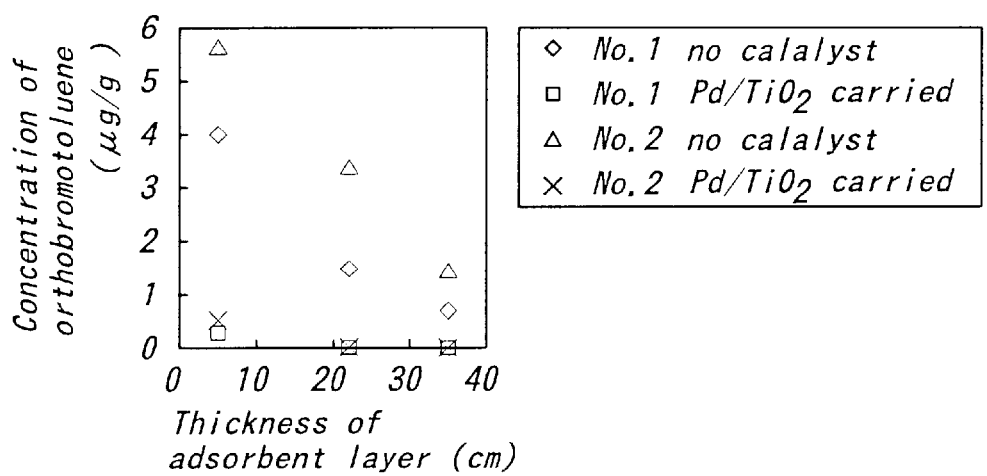
FIG. 8 is a graph showing the concentration of orthobromotoluene in adsorbents carrying Pd thereon.

According to the testing method in Example 1, the concentrations of orthochlorotoluene and that of orthobromotoluene were measured at inlets and outlets of the adsorbents by flowing simulated combustion waste gases containing orthochlorotoluene or orthobromotoluene. FIG. 5 is a graph showing the orgochlorotolune adsorption-removing characteristics. FIG. 6 shows the concentrations of orthochlorotoluene in the adsorbents. FIG. 7 is a graph showing the orthobromotoluene adsorption-removing characteristics. FIG. 8 shows the concentrations of orthobromotoluene in the adsorbents. It is seen from these figures that the orthobromotoluene and orthochlorotoluene adsorption-removing percentages were very high (not less than 99%), but the organic halogen compound existed inside the adsorbents carrying no catalyst thereon. However, a large amount of the organic halogen compound did not remain inside the adsorbent with the catalyst, which revealed that the organic halogen compound could be disposed of.

Industrial Applicability

As mentioned above, the adsorbent having the capability of decomposing the organic halogen compound according to the present invention not only adsorbs and decomposes the organic halogen compounds contained in the waste gases, but also can remove heavy metals, SOx, NOx, HCl, etc. by adsorption. Consequently, the adsorbent can prolong its useful life and suppress the amount of a secondary waste produced as compared with a case of activated carbon alone. Further, even if the concentrations of the organic halogen compounds including dioxins, brominated dioxins, etc. at the inlet of the catalyst is low, it is not feared that they are synthesized again. Therefore, such an adsorbent is suitably used for treating the waste gases from incinerators. The processes for producing an organic halogen compound-decomposing catalyst capable of decomposing organic halogen compounds according to the present invention can readily produce the above adsorbent having the capability of decomposing the organic halogen compound.

What is claimed is:

1. An adsorbent having the capability of decomposing an organic halogen compound, comprising an activated carbon, and an organic halogen compound-decomposing catalyst carried on the activated carbon, said organic halogen compound-decomposing catalyst having fine particles of Pt and/or Pd dispersed in $TiO_2$ by mixing a dispersion liquid of an organic metal compound precursor containing Pt and/or Pd and Ti in molecules thereof with a sol of $TiO_2$ and producing the catalyst under heating.

2. The adsorbent set forth in claim 1, wherein an amino acid is used as an organic binder.

3. The adsorbent set forth in claim 2, wherein said organic metal compound precursor comprises an alkoxide derivative of Ti.

4. The adsorbent set forth in claim 1, wherein said organic metal compound precursor comprises an alkoxide derivative of Ti.

5. A process for producing an adsorbent having the capability of decomposing an organic halogen compound, comprising reacting a salt of Pt and/or Pd, an organic titanium compound and an organic binder in a solvent, to thereby synthesize a dispersion of an organic metal compound precursor containing Pt and/or Pd and Ti in molecules thereof, mixing a sol of $TiO_2$ with the dispersion to prepare a catalyst-coating solution, impregnating an activated carbon with the catalyst-coating solution and heating the resulting mixture, thereby allowing the activated carbon to carry thereon an organic halogen compound-decomposing catalyst comprising $TiO_2$ and, dispersed therein, fine particles of Pt and/or Pd.

6. The process set forth in claim 5, wherein said organic binder comprises an amino acid.

7. The process set forth in claim 6, wherein said organic titanium compound comprises an alkoxide derivative of Ti.

8. The process set forth in claim 5, wherein said organic titanium compound comprises an alkoxide derivative of Ti.

* * * * *